United States Patent
Futschik et al.

[11] Patent Number: 6,109,679
[45] Date of Patent: *Aug. 29, 2000

[54] INSTRUMENT CLUSTER

[75] Inventors: Hans-Dieter Futschik, Gechingen; Norbert Weber, Bondorf, both of Germany

[73] Assignee: DaimlerChrysler AG, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/953,375

[22] Filed: Oct. 17, 1997

[30] Foreign Application Priority Data

Oct. 17, 1996 [DE] Germany ............ 196 42 834

[51] Int. Cl.⁷ ............................... B62D 25/14
[52] U.S. Cl. .................... 296/70; 180/90; D12/195
[58] Field of Search ................. 296/70; 180/90; D12/195, 192

[56] References Cited

U.S. PATENT DOCUMENTS

| | | | |
|---|---|---|---|
| D. 401,201 | 11/1998 | Saleen ........................... | D12/192 |
| D. 403,641 | 1/1999 | Sacco et al. ................... | D12/192 |
| 2,165,660 | 7/1939 | Snyder et al. ................. | 180/90 |
| 2,423,597 | 7/1947 | Hurn ............................. | 180/90 |
| 2,771,148 | 11/1956 | Nallinger ....................... | 180/90 |
| 2,855,066 | 10/1958 | Nallinger ....................... | 180/90 |
| 3,269,210 | 8/1966 | Steele, Jr. et al. ............ | 180/90 |
| 3,270,831 | 9/1966 | Woofter et al. ............... | 180/90 |
| 3,282,622 | 11/1966 | Komenda ...................... | 296/70 |
| 3,797,605 | 3/1974 | Letzel et al. .................. | 180/90 |
| 4,392,539 | 7/1983 | Fujii et al. ..................... | 180/90 |
| 4,475,614 | 10/1984 | Takamatsu et al. ........... | 180/90 |
| 4,690,432 | 9/1987 | Sakamoto et al. ............ | 180/90 |
| 5,067,670 | 11/1991 | Radcliffe ....................... | 180/90 |
| 5,709,601 | 1/1998 | Heck ............................. | 296/70 |

FOREIGN PATENT DOCUMENTS

| | | |
|---|---|---|
| 0 083 701 | 7/1983 | European Pat. Off. |
| 33 46 370 | 7/1985 | Germany . |
| 43 43 201 | 6/1995 | Germany . |
| 57-164816 | 10/1982 | Japan . |
| 8-040114 | 2/1996 | Japan . |

*Primary Examiner*—Joseph D. Pape
*Assistant Examiner*—Kiran Patel
*Attorney, Agent, or Firm*—Evenson, McKeown, Edwards & Lenahan, P.L.L.C.

[57] ABSTRACT

The invention relates to an instrument cluster with a surround located in front of the display field, the front surface of the instrument cluster conforming to a predetermined path of an instrument panel. The surround is an independent component releasably fastenable to an instrument cluster, with the back surface of the surround facing the front surface of the instrument panel and running parallel to the front surface of the instrument cluster, and with the front surface of the surround that faces away from the instrument cluster following a path that conforms to the path of the instrument panel in the vicinity of the respective driver's seat. A surround is used for a vehicle with left-hand drive, with the front surface of the surround conforming to the path of the instrument panel, and with another surround being used for a vehicle with right-hand drive, whose front surface conforms to the path of the instrument panel in the vicinity of the right-hand driver's seat.

6 Claims, 2 Drawing Sheets

INSTRUMENT CLUSTER

BACKGROUND AND SUMMARY OF THE INVENTION

This application claims the priority of German patent application number 196 42 834.3, the disclosure of which is expressly incorporated by reference herein.

The invention relates to an instrument cluster, and more particularly to an instrument cluster with a housing part that has a front frame and a surround located in front of the frame, with the instrument mechanisms and the front cover being contained in the front frame.

An instrument cluster of the type generally described above is known from German patent document DE 43 43 201 A1, that consists of a housing rear part and a housing front part, said parts being assembled and accepting the instrument mechanisms, with the rear part of the housing being placed on a diagonal instrument panel. The front part of the housing has a front frame with a surround located in front of said frame, and forms a one-piece component in which the front frame has a tube on the back to receive the instrument mechanisms. At a distance from the front surface of the surround, the front frame has an internal projection on which a cover plate is mounted, said plate being fastened by welding or gluing or being encapsulated by injection molding as an insert when making the front part of the housing in one workstep.

An instrument cluster is also known from German patent document DE 33 46 370 A1, in which the display area extends at a distance from the front of the instrument panel and therefore follows a path that differs from the path of the instrument panel, namely diagonally and vertically. Beginning at this display area, a housing part of the instrument cluster that acts as a surround projects forward in this instrument cluster, with the front surface of this forwardly extending housing part conforming to the path of the instrument panel. The front area of the housing of the instrument cluster that acts as a surround is made integral with the rest of the housing part.

Vehicles are known in which the instrument panel does not have a path that is symmetric as viewed across the width of the vehicle, but the path is asymmetric. The instrument cluster located in the vicinity of the driver's seat must conform to this path as well.

As a result, an instrument cluster designed for a vehicle with left-hand drive cannot be used for vehicles with right-hand drive and vice versa. Thus, in such cases of asymmetric instrument panels, adaptation to these two types of vehicle is only possible at the considerable expense of providing completely different instrument clusters. This results in considerable cost as well as a considerable investment in logistics and warehousing.

Thus, there is a need for an instrument cluster with a surround located in front of a display field, which can be adapted to an instrument panel having an asymmetric pattern in both of a vehicle with left-hand drive and a vehicle with right-hand drive, at a relatively minor cost of adaptation.

This and other needs have been met according to the present invention by providing an instrument cluster comprising a housing part having a front frame and a surround located in front of the frame, with instrument mechanisms and a front cover being contained in the front frame, wherein a front surface of the front frame extends within a plane, the surround being an independent part that can be releasably mounted on the front frame and having a front surface that conforms to a surface of an instrument panel, the surround having a back surface facing the front frame, the back surface extending within a plane at least essentially parallel to the front surface of the front frame.

Since the surround constitutes an independent component that is removably mountable on the remaining part of the instrument cluster, when the instrument panel has an asymmetric pattern, only one suitably designed surround is required in order to be able to use the instrument cluster for both vehicles with left-hand drive and those with right-hand drive. The actual instrument part with a display field and individual instruments can be used as a neutral component in both versions. This results in a cost reduction, especially in the expense and effort devoted to logistics and warehousing.

Other objects, advantages and novel features of the present invention will become apparent from the following detailed description of the invention when considered in conjunction with the accompanying drawings.

DETAILED DESCRIPTION OF THE DRAWINGS

Figure 1:
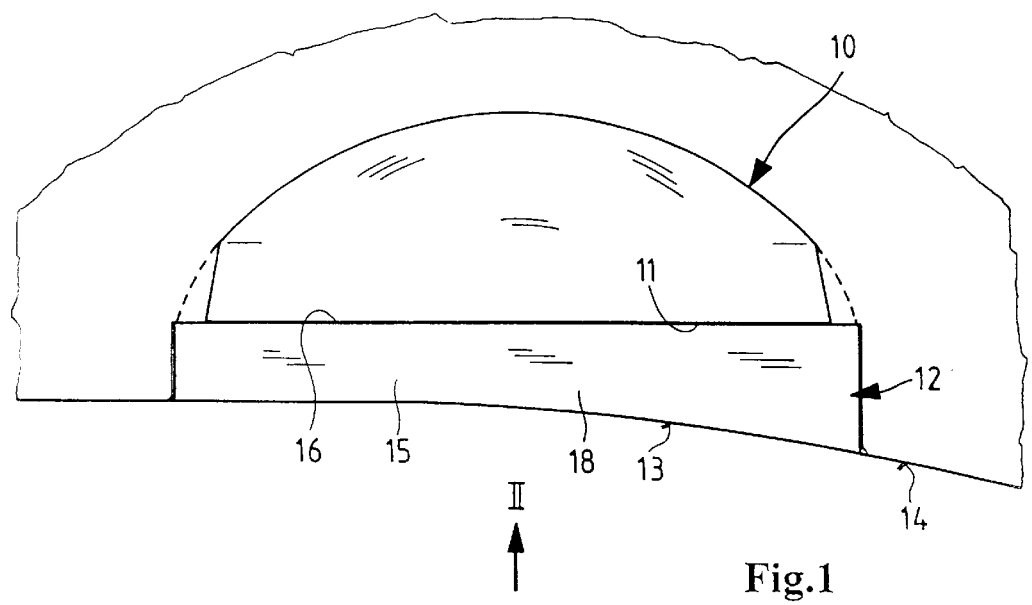
FIG. 1 is a schematic top view of an instrument cluster with a surround located in front according to a first preferred embodiment of the present invention.
Figure 2:
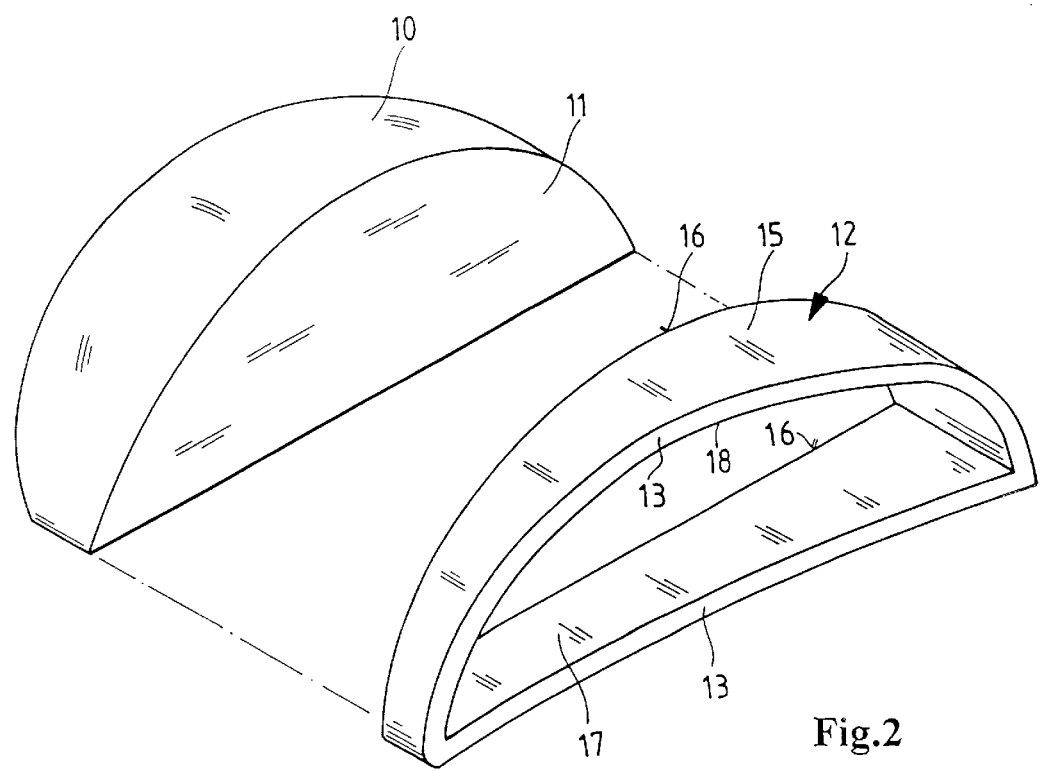
FIG. 2 is a schematic view of the instrument cluster and the surround, looking in the direction of arrow II of FIG. 1, with the surround not yet mounted on the instrument cluster.

FIGS. 1 and 2 show an instrument cluster 10 in schematic form, said cluster having a display field located further inward in the usual fashion, in the vicinity of its front surface 11 for example, which can be covered by a lens, or at a distance from front surface 11. A surround 12 is mounted in front of instrument cluster 10, the front surface of said surround following a specified path or surface 14 of an instrument panel. In the first embodiment shown in FIGS. 1 and 2, a surround 12 is provided whose front surface 13 facing away from instrument cluster 10 has a curvature such that it follows surface 14 of the instrument panel in the vicinity of the driver's seat in a vehicle with left-hand drive.

The surface 14 of the instrument panel is asymmetrical when viewed from above, relative to a widthwise axis of the vehicle. Accordingly, the front surface 13 of the surround 12 is configured to conform to the asymmetrical surface 14 of the instrument panel, as shown in FIG. 1, and furthermore the surround 12 has a depth which varies from one lateral side to the other. Such a configuration compensates for the asymmetrical surface 14 of the instrument panel in order to direct the display field of the instrument cluster toward the driver, who is viewing the instrument panel from the direction of arrow II in FIG. 1.

Surround 12 is designed relative to instrument cluster 10 as an independent component 15 that can be releasably mounted on instrument cluster 10. Mounting this component 15 on instrument cluster 10 can be accomplished in a variety of ways, using differently designed conventional fastening elements and fastening means.

Front surface 11 of instrument cluster 10 runs within a plane, as is particularly evident from FIG. 1. Surround 12, on its rear side facing instrument cluster 10, has a plane rear surface 16, said surface extending for example inside plane front surface 11 of instrument cluster 10, as shown in FIG. 1, with surround 12 abutting said plane front surface 11 by its rear surface 16.

In another embodiment, not shown, plane rear surface 16 of surround 12 extends at least essentially parallel to front surface 11 and at a distance therefrom.

Surround 12 is designed as a frame located in front of instrument cluster 10 and preferably consists of a plastic part for example, especially a molded plastic part. Frame-shaped surround 12 has sufficiently thickly dimensioned wall parts 17 and 18 whose path, viewed within a plane that contains rear surface 16, follows the path of instrument cluster 10, looking in the plane that contains plane front surface 11.

The totality of instrument cluster in FIGS. 1 and 2 is thus in two parts. It consists firstly of instrument cluster 10 which is an element and contains all the components of the instrument, and secondly of independent part 15 that is designed as a replaceable front frame, said frame acting as a front surround and being used to conform to surface 14 of the instrument panel in question. In the first embodiment in FIGS. 1 and 2, a frame of this kind is located in front of instrument cluster 10, the front surface 13 of said cluster following surface 14 of the instrument panel in the vicinity of the driver's seat, as located in a vehicle with left-hand drive.

Figure 3:
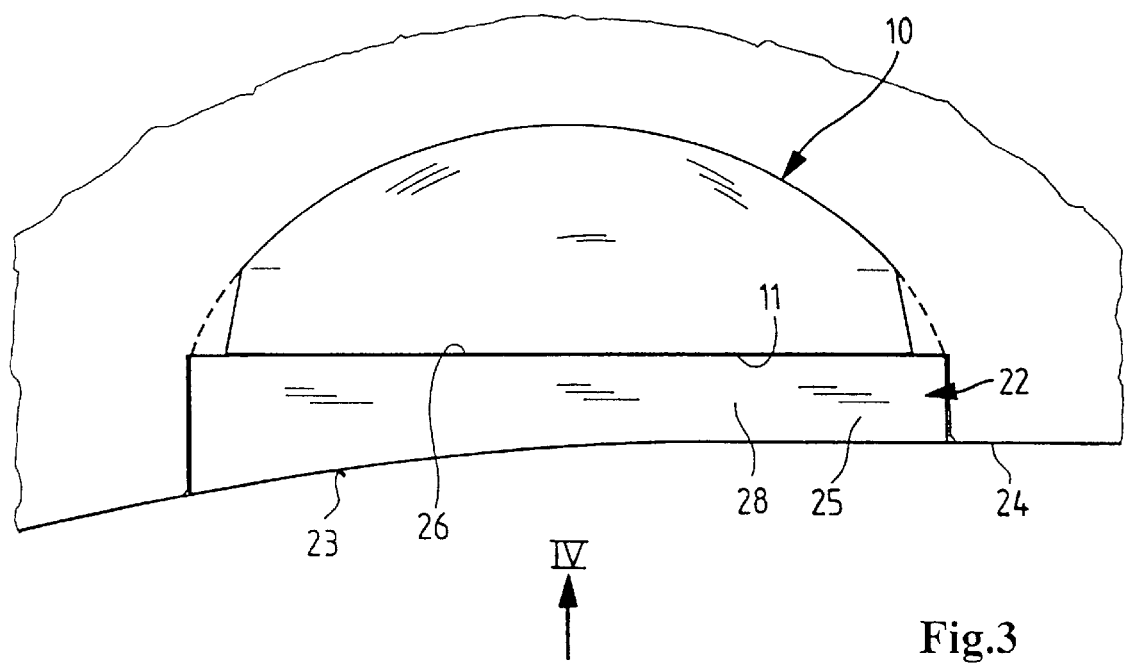
FIG. 3 is a schematic top view roughly corresponding to that in FIG. 1 and showing an instrument cluster with a surround located in front, according to a second preferred embodiment.
Figure 4:
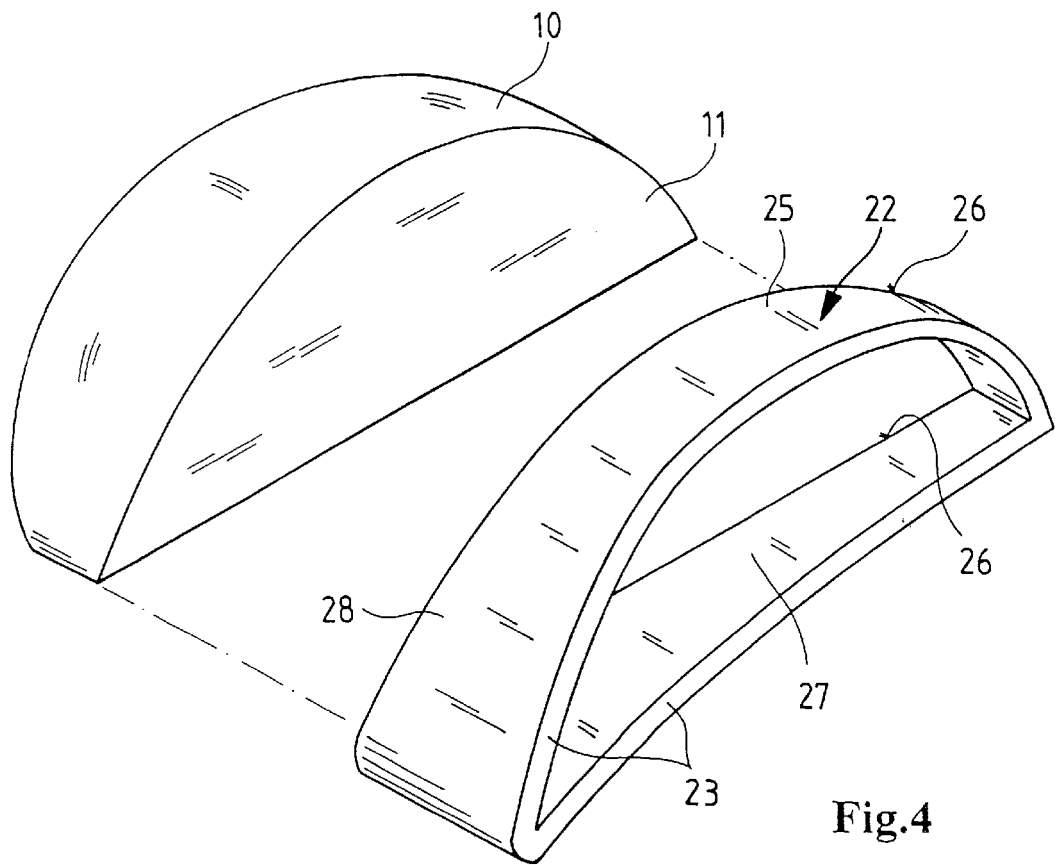
FIG. 4 is a schematic view roughly corresponding to that in FIG. 2 of the instrument cluster and the surround, looking in the direction of arrow IV in FIG. 3, but with the surround not mounted.

In a second embodiment shown in FIGS. 3 and 4, the same instrument cluster 10 is shown, with a plane front surface 11 as in the first embodiment in FIGS. 1 and 2. By contrast with the first embodiment however, another surround 22 is located in front. Surround 22 differs from surround 12 in the first embodiment solely in having a different path for its front surface 23, said path being curved such that it follows path 24 of the instrument panel in the vicinity of the driver's seat, not shown, in a vehicle with right-hand drive. This is especially evident from the top view in FIG. 3. In accordance with the first embodiment, surround 22, on its rear side facing flat front surface 11 of instrument cluster 10, has a plane back surface 26. While in the first embodiment according to FIGS. 1 and 2, wall parts 17 and 18 of surround 12 in the top view in FIG. 1 have a width that increases from left to right to conform to surface 14 of the instrument panel, in the second embodiment shown in FIGS. 3 and 4 wall parts 28 and 27 of surround 22 have a width that increases from right to left in the drawing to conform to path 24 of the instrument panel. This is therefore the only difference relative to surround 12.

Surround 12 according to FIGS. 1 and 2 is used for a vehicle with left-hand drive and the driver's seat on the left, while a surround 22 according to the second embodiment shown in FIGS. 3 and 4 is used in a vehicle with right-hand drive and the driver's seat on the right. Instrument cluster 10 remains the same. Thus, it can be used for both versions described above, with said versions being reflected only in the choice of surround 12 or 22. As a result, costs are reduced to a minimum, since the only component that must be adapted is surround 12 or 22 as required, said surround being especially economical if made as a plastic part. It is also advantageous that further savings are achieved in logistics and warehousing because of the small volume of surround 12 or 22.

In FIGS. 1 to 4, surrounds 12 and 22 project beyond the circumferential outline of instrument cluster 10. This is not necessary, however. As indicated by the dashed lines in FIGS. 1 and 3, surrounds 12 or 22 can also fit flush to instrument cluster 10.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An instrument assembly, comprising:

an instrument cluster having a plane front surface;

an instrument panel having a panel surface spaced from said plane front surface wherein at least a portion of said panel surface is one of a first curved portion and a second curved portion; and a separately formed surround section positioned between said instrument cluster and said instrument panel, said surround section having a front surface and a back surface wherein said back surface is planar and said front surface has one of a third curved portion and a forth curved portion wherein said third curved portion conforms with said first curved portion of said instrument panel and said fourth curved portion conforms with said second curved portion of said instrument panel.

2. The instrument assembly according to claim 1, wherein said first curved portion of said panel surface of said instrument panel is a portion of a left hand drive vehicle instrument panel and wherein said second curved portion of said panel surface of said instrument panel is a portion of a right hand drive vehicle instrument panel.

3. The instrument assembly according to claim 1, wherein said surround section is a one-piece component.

4. The instrument assembly according to claim 1, wherein said surround section is a plastic component.

5. The instrument assembly according to claim 1, wherein said surround section is a molded plastic component.

6. An adapter arrangement for conforming an instrument cluster of an automobile to an instrument panel, comprising:

a separately formed surround section for positioning between said instrument cluster and said instrument panel, said surround section having a front surface and a back surface wherein said back surface is a front planar surface conforming with a planar front surface of said instrument cluster and wherein at least a portion of said front surface of said surround section is either a first curved portion or a second curved portion wherein said first curved portion conforms with a curved portion of a panel surface of a left hand drive instrument panel and wherein said second curved portion of said surround section conforms with a panel surface of a right hand drive instrument panel.

* * * * *